Feb. 5, 1963  N. COHN  3,076,898
MULTI-SEGMENT GENERATION ALLOCATING SYSTEMS
Filed May 3, 1961  5 Sheets-Sheet 1

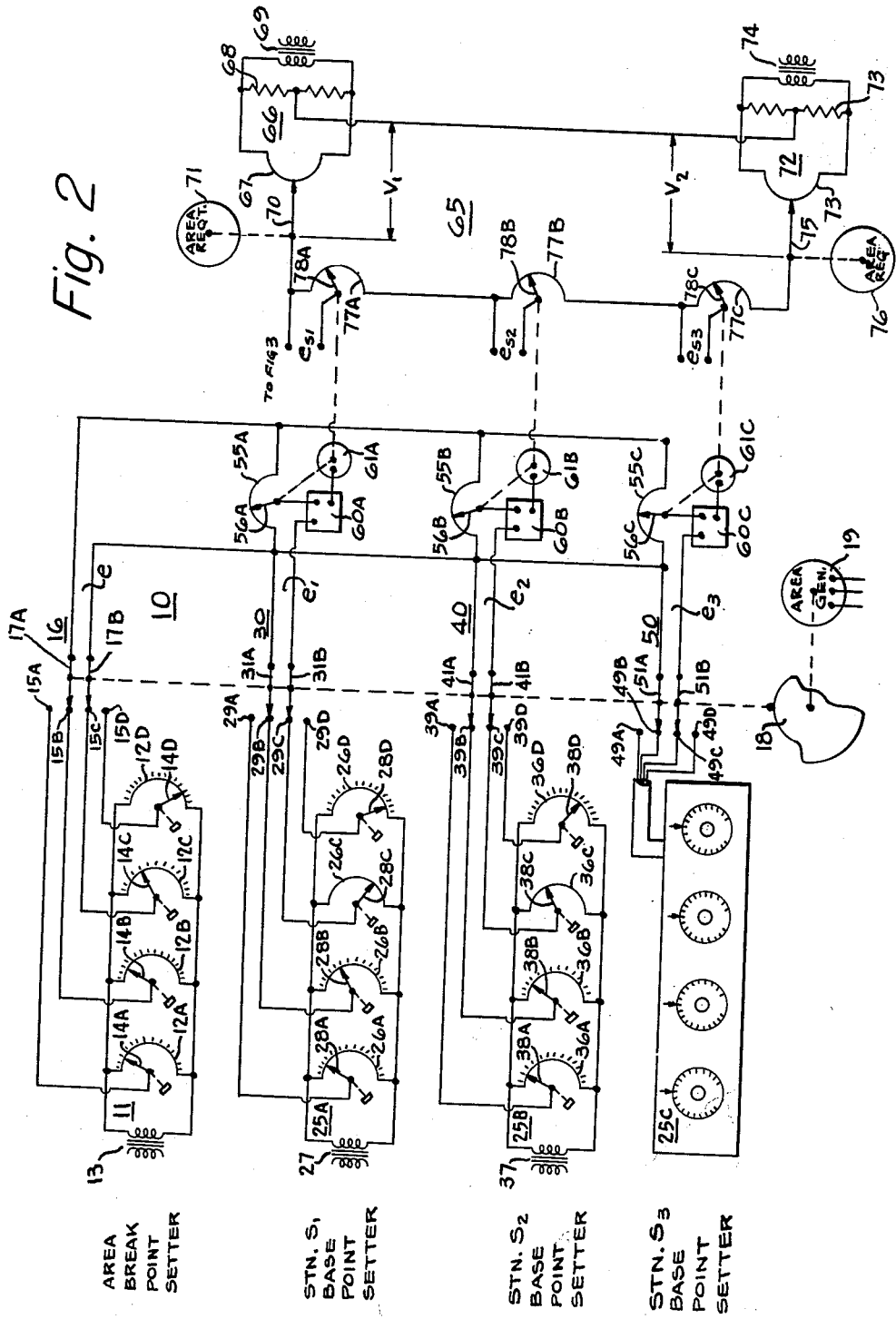

3,076,898
Patented Feb. 5, 1963

3,076,898
MULTI-SEGMENT GENERATION ALLOCATING SYSTEMS
Nathan Cohn, Jenkintown, Pa., assignor to Leeds and Northrup Company, Philadelphia, Pa., a corporation of Pennsylvania
Filed May 3, 1961, Ser. No. 107,475
18 Claims. (Cl. 307—57)

This invention relates to systems for allocating the total generation desired of a group of generating sources among the individual sources in accordance with a preset loading schedule.

In my Patent 2,773,994 there is disclosed generation allocation systems wherein the loading schedule for each participating source is preset by means of basepoint and participation setters. In the present invention, the need for manually-operated participation setters is eliminated, and instead the participation values are automatically computed and automatically introduced into appropriate points of the allocation networks. With the present invention, basepoints only for each source are preset, simplifying correspondingly the setting of allocation schedules by the load dispatcher.

In accordance with the present invention, there are produced a plurality of fixed signals representative of upper and lower basepoint generations of the individual generating sources. There are also produced fixed signals representative of the upper and lower area breakpoint generations of all generating sources of the group. In normal operation, these area breakpoint generations are equal to the sum of the corresponding basepoint generations of the individual sources. The aforesaid signals are effectively combined with a signal representative of the total generation to be allocated to produce a plurality of generation-allocation signals each representative of the extent to which the generation of the corresponding source should be above its lower basepoint or below its upper basepoint. To each of such generation-allocation signals may be combined a fixed signal representative of the lower or upper basepoint of the corresponding source so that the resultant signal is representative of the generation required of that source to put it on schedule.

Also in accordance with the present invention, when the loading schedule is of the multi-segment type, there are provided switching means effective upon change of total generation through an area breakpoint, to shift to adjacent allocation segments by transferring to the upper and lower basepoints of the source schedule segment then to be in effect. On occurrence of such a transfer in the direction of increasing generation, the prevailing upper basepoint becomes the new lower basepoint. On occurrence of such a transfer in the direction of decreasing generation, the prevailing lower basepoint becomes the new upper basepoint.

A feature of the present invention is that the basepoint setters with which source allocation schedules are preset may be calibrated to read directly in megawatts or other measure of source output, and the re-setting of one basepoint setter does not affect the direct reading calibration of the other basepoint setters.

The invention further resides in computing circuits having features of combination and arrangement hereinafter described and claimed.

For a more detailed understanding of the invention as embodied in several embodiments thereof, reference is made in the following description of them to the attached drawings in which:

FIG. 2 is the circuit diagram of one form of the invention for producing generation-allocation signals;

Figure 1:
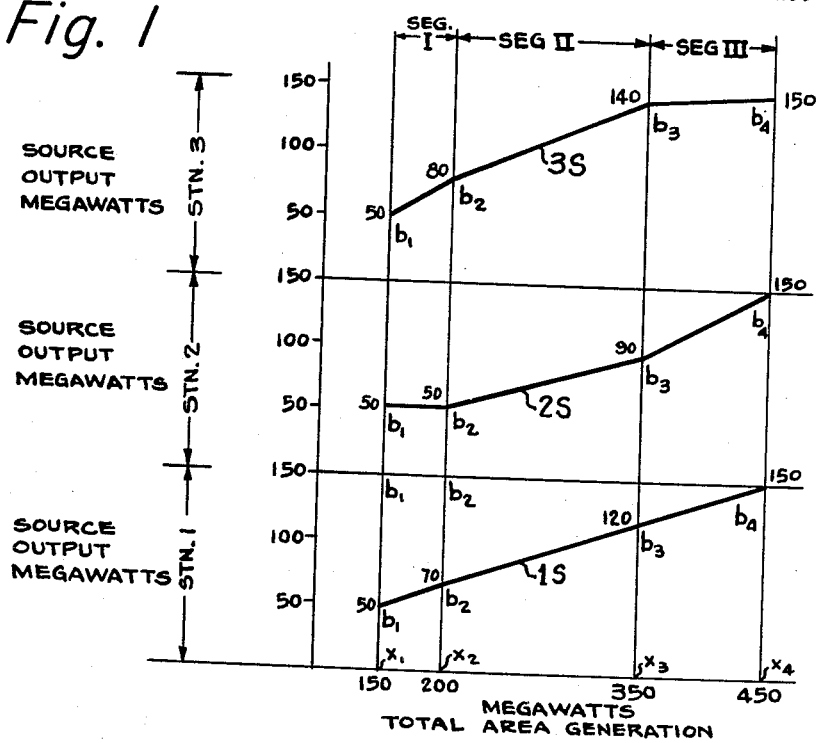
FIG. 1 represents a specific example of a multi-segment loading schedule for the stations of a generation area.

To achieve efficient area operation while fulfilling an area's overall regulating requirements, the assignment of generation among stations of the area is sometimes in accordance with automatically computed loading schedules, and sometimes in accordance with preset loading schedules. Such preset schedules or loading curves are generally prepared prior to the operating period to which they are to apply. They take into consideration which generating facilities are available and what their relative capacities and incremental economies are. The schedules may also include the weight of other factors, such as loadings and losses on transmission lines, locations of reserves, the ability of specific plants to respond to control action and stream flow or storage conditions where hydro-power is involved. A load dispatcher would have such curves or equivalent to assign generation to stations either automatically or manually. These loading schedules may be simple or complex and they may be fixed or they may vary during the course of a day. For purposes of the present discussion, it will be assumed that the loading schedules of FIG. 1 are to apply to three stations of an area. Specifically, the curves 1S, 2S, 3S are respectively the loading schedules of the stations S1, S2, S3 of an area. Quantitative magnitudes have been assigned to these curves to facilitate the examination of how each station is to be loaded as the total area generation varies. Also these quantitative values will be used later in the discussion to explain how the computing circuit adjustments are made.

In the specific example under discussion, the total area generation is broken into three segment groups: the first defined by the area-generation breakpoints $X_2$ and $X_1$; the second defined by the breakpoints $X_3$ and $X_2$; and the third defined by the breakpoints $X_4$ and $X_3$. For each area breakpoint, there is a corresponding set of station basepoints whose sum is equal to the area generation at the breakpoint. For example, for the lower breakpoint $X_2$ of Segment II, the sum of the station basepoints $b_2$ is $70+50+80$, totaling 200 megawatts; and for the upper breakpoint $X_3$ of Segment II, the sum of the station basepoints $b_3$ is $120+90+140$, totaling 350 megawatts.

The desired generation for any station within any segment of its loading schedule can be computed from the equation (1) $\qquad G_\mathrm{S} = b_\mathrm{d} + [G_\mathrm{A} - X_\mathrm{d} \pm N]\left[\dfrac{b_\mathrm{u}-b_\mathrm{d}}{X_\mathrm{u}-X_\mathrm{d}}\right]$ where $b_\mathrm{d}$=station basepoint at low end of segment
$b_\mathrm{u}$=station basepoint at high end of segment
$X_\mathrm{d}$=area breakpoint at low end of segment
$X_\mathrm{u}$=area breakpoint at high end of segment
$G_\mathrm{A}$=area generation
$N$=area requirement
$G_\mathrm{A}-X_\mathrm{d}$=area regulation In FIG. 2, there is shown an arrangement for continuously solving Equation 1 for each of the stations S1, S2, S3. The computer network 10 comprises a network 11 for producing a series of output voltages or signals in number corresponding with the number of segments of the loading schedule and in magnitude respectively corresponding with the difference between the upper and lower area breakpoints which define the corresponding segments of each loading schedule. Specifically, the network 11 comprises a group of slidewires 12A–12D connected in parallel across a suitable supply source exemplified by transformer 13. The relatively adjustable contacts 14A–14D of the slidewires 12A–12D are respectively connected to the fixed contacts 15A–15D of the segment transfer switch 16. The slidewires 12A–12D are each calibrated in terms of megawatts or other suitable unit of power and are each respectively preset in accordance with the area breakpoints of the loading schedule to be put into effect. In the specific example under discussion, the slidewires 12A–12D would be respectively set to 150, 200, 350 and 450 megawatts corresponding with the breakpoints $X_1$–$X_4$ inclusive of the loading schedule shown in FIG. 1. The movable contacts 17A, 17B of switch 16 are stepped from one pair to another of the fixed contacts when the total area generation shifts from one segment to the next of the operating schedule. More specifically, when the total area generation is in Segment I of the loading schedule, the movable contacts 17A, 17B of switch 16 are in engagement with fixed contacts 15A, 15B: when the total area generation is in Segment II, the movable contacts 17A, 17B are in engagement with fixed contacts 15B, 15C: and when the total area generation is in Segment III, the movable contacts 17A, 17B are in engagement with fixed contacts 15C, 15D. Thus, with the slidewires 12A–12D present in correspondence with the successive area breakpoints, the output voltage $e$ of network 11 as appearing between the contacts 17A, 17B of switch 16 corresponds with the difference between the upper and lower area breakpoints of the schedule segment corresponding with the switch position. Specifically, for the first switch position, the voltage $e$ represents $(X_2-X_1)$; for the second switch position, voltage $e$ represents $(X_3-X_2)$; and for the third switch switch position, voltage $e$ represents $(X_4-X_3)$. Contacts 17A, 17B of the segment transfer switch 16 may be manually actuated or step-actuated by any suitable means responsive to total area generation. For example, they may be actuated by a cam 18, which is driven or otherwise controlled by wattmeter 19 responsive to total area generation. The successive dwell sections or cam 18 may be adjusted to correspond in angular extent with the length of the corresponding segment of the loading schedule. For the position of cam 18 shown in FIG. 2, the total area generation is in Segment II and the output voltage $e$ of network 11 represents the difference between the breakpoints $X_3$, $X_2$. Alternatively, the switch 16 may be a stepping relay controlled by contacts set in accordance with area breakpoints in the path of an actuating arm positioned by wattmeter 19. As another alternative, the stepping switch 16 may be effected by amplifier-relay arrangements, similar to those of FIG. 7, whose input circuits are responsive to total generation and to the successive area breakpoints.

The network 10 also includes the networks 25A, 25B and 25C in number corresponding with the stations of the area. Since these networks are similar in composition and mode of operation, it should suffice to discuss only one of them in detail. Each of them is for producing a series of output voltages in number corresponding with the number of segments of the loading schedule of the corresponding station and in magnitude corresponding with the difference between the upper and lower station basepoints which define a corresponding segment of the station loading schedule for that station. Specifically, the network 25A for station S1 comprises a group of slidewires 26A–26D or equivalent adjustable impedances connected in parallel across a suitable supply source exemplified by transformer 27. The relatively adjustable contacts 28A–28D of these slidewires are respectively connected to the fixed contacts 29A–29D of segment transfer switch 30. The slidewires 26A–26D are each calibrated in terms of megawatts or other unit of power and are each respectively preset in accordance with the station basepoints of the loading schedule for station S1. In the specific example under discussion, the slidewires 26A–26D would be respectively preset to 50, 70, 120 and 150 megawatts corresponding with the values of the basepoints $b_1$–$b_4$ for station S1 shown on curve 1S of FIG. 1.

The movable contacts 31A, 31B of switch 30 are positioned, as by cam 18, relative to the successive pairs of fixed contacts 28A–28D in accordance with the total area generation. Specifically for Segment I of the loading schedule 1S, the movable contacts 31A, 31B are respectively in engagement with fixed contacts 29A, 29B: for Segment II of the loading schedule 1S, the movable contacts 31A, 31B respectively engage fixed contacts 29B, 29C: and for Segment III of the loading schedule, the movable contacts 31A, 31B respectively engage fixed contacts 29C, 29D.

Thus, with slidewires 26A–26D preset in accordance with the successive basepoints for station S1, the output voltage $e_1$ of network 25A, as appearing across the contacts 31A, 31B of switch 30, corresponds, for each of the switch positions, with the difference between the corresponding pair of station basepoints. Specifically, when the total area generation is in Segment I of the loading schedule, the movable contacts 31A and 31B of switch 30 are in engagement with fixed contacts 29A and 29B, and the voltage $e_1$ represents $(b_2-b_1)$: when the total area generation is in Segment II, movable contacts 31A and 31B are in engagement with fixed contacts 29B and 29C, and the voltage $e_1$ represents $(b_3-b_2)$: and when the total area generation is in Segment III, movable contacts 31A and 31B are in engagement with fixed contacts 29C and 29D and the voltage $e_1$ represents $(b_4-b_3)$.

The network 25B similarly includes a group of calibrated slidewires 36A–36D which are respectively preset in accordance with the corresponding basepoints $b_1$ to $b_4$ of loading schedule 2S for station S2. These slidewires are powered in parallel from transformer 37 or through a suitable supply source and their relatively adjustable contacts 38A–38D are respectively connected to fixed contacts 39A–39D of segment transfer switch 40. The movable contacts 41A, 41B of switch 40 are actuated by cam 18 or equivalent device responsive to total area generation. For Segment I of loading schedule 2S, the movable contacts 41A, 41B respectively engage fixed contacts 39A, 39B so that the output voltage $e_2$ of network 25B represents the basepoint difference $(b_2-b_1)$: for Segment II, the movable contacts 41A, 41B respectively engage fixed contacts 39B, 39C so that the voltage $e_2$ represents the basepoint difference $(b_3-b_2)$ of schedule 2S: and for Segment III, the movable contacts 41A, 41B respectively engage fixed contacts 39C–39D so that the output voltage $e_2$ represents the basepoint difference $(b_4-b_3)$ of the loading schedule 2S for station S2.

It will be understood from the foregoing that network 25C similarly includes adjustable impedances preset in accordance with the successive basepoints $b_1$ to $b_4$ of loading schedule 3S for station S3, and that the switch 50 positioned by cam 18 or equivalent provides that the output voltage $e_3$ of network 25C corresponds for each position of switch 50 with the difference between the station basepoints of the corresponding segments of the schedule 3S.

The network 10 also includes a group of slidewires 55A–55C in number corresponding with the number of station. These slidewires are connected in parallel and excited by output voltage $e$ of the area-breakpoint network 11. Thus, as each segment of the station loading schedules sequentially comes into effect because of change in area generation, there is produced across each of the slidewires 55A–55C a voltage whose magnitude is representative of the difference between the upper and lower area breakpoints of that segment; for example, with the switch 16 in the position shown, the voltage $e$ across each of slidewires 55A–55C represents the difference between the upper area breakpoint $X_3$ and the lower area breakpoint $X_2$ of Segment II of the loading schedule.

The output voltage $e_1$ of the basepoint network 25A for station S1 is compared with the voltage $e$ across slidewire 55A by a self-balancing arrangement including amplifier 60A and a servo-motor 61A in the output circuit thereof. In the input circuit of amplifier 60A, the voltage $e_1$ is in opposition to a fraction of voltage $e$, the magnitude of the fraction depending upon the position of slidewire contact 56A. When these input voltages of amplifier 60A are not in balance, the resulting output energizes motor 61A to adjust the position of contact 56A until balance is obtained and the position of the contact 56A corresponds with the ratio $$\frac{e_1}{e}$$

In like manner, the output voltage $e_2$ of the basepoint network 25B for station S2 is compared with the voltage $e$ across slidewire 55B by the self-balancing arrangement including amplifier 60B and servo-motor 61B. Similarly, the output voltage $e_3$ of network 25C for station S3 is compared with the voltage $e$ across slidewire 55C by the self-balancing arrangement including amplifier 60C and servo-motor 61C. With the switches 16, 30, 40 and 50 in the position corresponding with Segment I of the loading schedules and with the amplifiers 60A–60C in balance, the positions of contacts 56A, 56B, 56C each represents the ratio $$\frac{(b_2-b_1)}{(X_2-X_1)}$$

for Segment I of the corresponding station schedule: with the switches in the position corresponding with Segment II of the loading schedules and with the amplifiers in balance, the positions of contacts 56A, 56B, 56C each represents the ratio $$\frac{(b_3-b_2)}{(X_3-X_2)}$$

for Segment II of the corresponding station schedule: and with the switches in the position corresponding to Segment III and with the amplifiers in balance, the positions of contacts 56A, 56B, 56C each represent the ratio $$\frac{(b_4-b_3)}{(X_4-X_3)}$$

for Segment III of the corresponding station schedule.

It will be recognized that these ratios each represent the slope of the corresponding segment of the station loading schedule and are each specific forms of the ratio term $$\frac{(b_u-b_d)}{(X_u-X_d)}$$

of Equation 1.

With the area breakpoints and station basepoints set into the networks 11, 25A–25C in accordance with the particular loading schedules of FIG. 1, the slopes defined by the positions of contacts 56A, 56B, 56C for the different positions of the segment transfer switches 16, 30, 40 and 50 are indicated by Table I below:

*Table I*

| Position of— | Segment I $\frac{b_2-b_1}{X_2-X_1}$=slope | Segment II $\frac{b_3-b_2}{X_3-X_2}$=slope | Segment III $\frac{b_4-b_3}{X_4-X_3}$=slope |
|---|---|---|---|
| Contact 56A | $\frac{70-50}{200-150}=0.40$ | $\frac{120-70}{350-200}=0.333+$ | $\frac{150-120}{450-350}=0.3$ |
| Contact 56B | $\frac{50-50}{200-150}=0$ | $\frac{90-50}{350-200}=0.267-$ | $\frac{150-90}{450-350}=0.6$ |
| Contact 56C | $\frac{80-50}{200-150}=0.60$ | $\frac{140-80}{350-200}=0.4$ | $\frac{150-140}{450-350}=0.1$ |

It is now explained how these slope terms produced by network 10 are introduced into and utilized in network 65 to compute the various generations required of each of the stations to meet its loading schedule.

Figure 5:
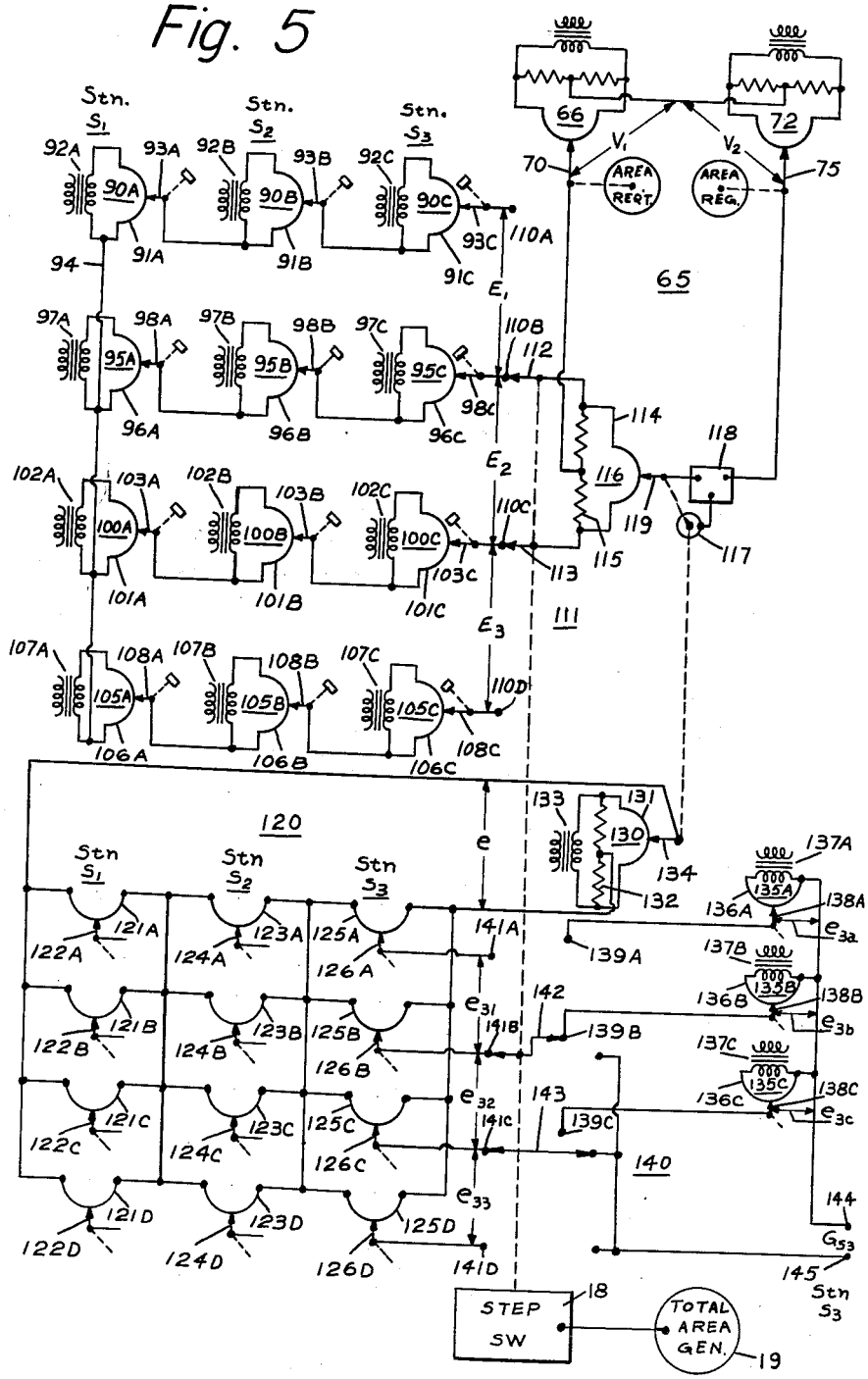
FIG. 5 is the circuit diagram of another system embodying the invention to provide generation-allocation signals representative of the required generation of the generating sources.

The network 65 is similar to network 54 of FIG. 5 of my Patent 2,773,994 to which reference may be had for a more detailed explanation of its composition. In brief, the subsidiary network 66 of FIG. 2 hereof includes a slidewire 67 which is either center-tapped or connected in parallel to a center-tapped impedance or resistance 68 and is powered from a suitable supply source exemplified by transformer 69. The contact 70 is adjusted relative to its slidewire 67 so that the voltage $V_1$ between contacts 70 and the center-tap corresponds in polarity and magnitude with the sense and magnitude of any existing area requirement $(N)$. Such adjustment may be effected by an area-requirement meter 71, suitable forms of which are referred to in my aforesaid patent.

The subsidiary network 72 includes a slidewire 73 which is effectively center-tapped by connection in parallel to the center-tapped resistance 73a and is connected to a suitable supply source exemplified by transformer 74. The slidewire contact 75 is adusted relative to slidewire 73 so that the voltage $V_2$ between contacts 75 and the center-tap continuously corresponds in polarity and magnitude with the existing area regulation $(G_A-X_d)$. Such adjustment may be effected by an area-regulation meter 76, a suitable form of which is shown in my aforesaid patent.

The station-participation slidewires 77A–77C are connected in circuit with the networks 66 and 72 for traverse by a current which is the algebraic sum of the area-requirement and the area-regulation and so corresponds with the quantity $(G_A-X_d\pm N)$ of Equation 1.

The contacts 78A, 78B, 78C of slidewires 77A, 77B, 77C are respectively coupled to the servo-motors 61A, 61B, 61C so that their positions respectively correspond with the slopes of those segments of the loading schedules which are in effect. Thus, the effective output voltages $e_{S1}$, $e_{S2}$, $e_{S3}$ of the slidewires 75A, 75B, 75C respectively represent the extent to which the generation of each of stations S1, S2, S3 should be above its applicable basepoint to satisfy the area requirement and at the same time maintain the desired sharing of load between the stations as set by their loading schedules.

More specifically, each of these voltages is a solution of the expression $$[G_A-X_d\pm N]\left[\frac{b_u-b_d}{X_u-X_d}\right]$$

for the corresponding station taking into account the then effective segment of its loading schedule.

Figure 3:
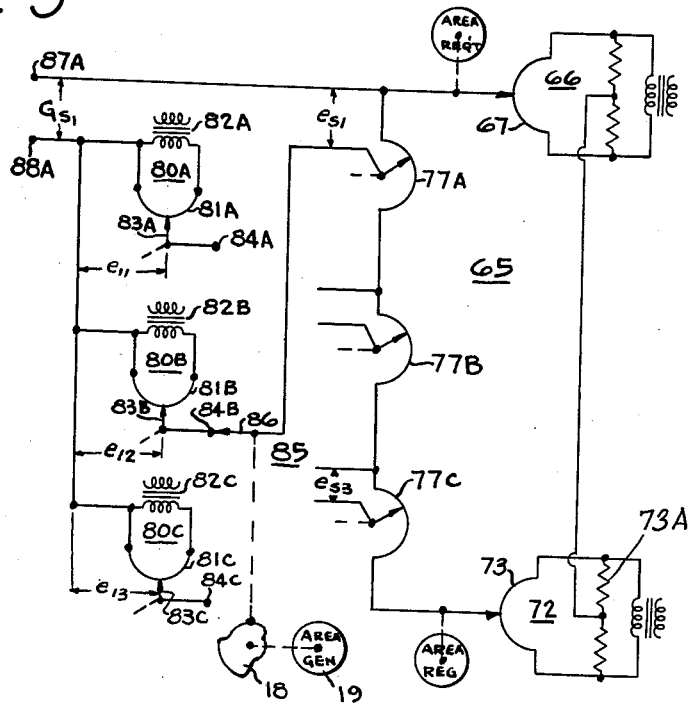
FIG. 3 is the circuit diagram of an arrangement for combining one of the generation-allocation signals produced by the system of FIG. 2 with a basepoint signal.

To complete the solution of Equation 1, there is added in series with each of the voltages $e_{S1}$, $e_{S2}$, $e_{S3}$ a voltage whose magnitude represents the lower basepoint of the corresponding station for the schedule segment then in effect. In FIG. 3, there is shown an arrangement for adding such basepoint voltage to voltage $e_{S1}$ to produce an indicating or control voltage corresponding with the desired generation $G_{S1}$ for station S1. From this figure and the following explanation thereof, it would be evident how the same arrangement may be applied for determining the desired generations $G_{S2}$ and $G_{S3}$ for the other stations S2 and S3 of the area.

Figure 4:
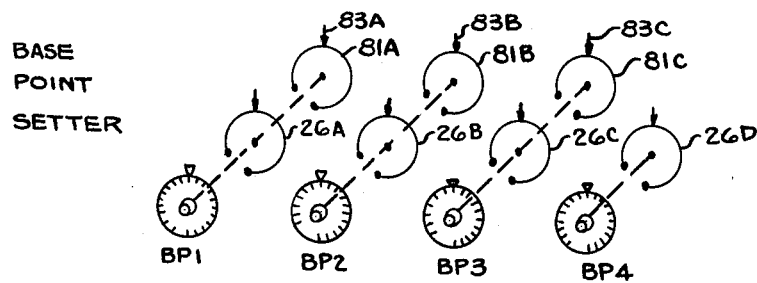
FIG. 4 illustrates an arrangement for presetting the basepoints of an individual generating source into various networks of FIG. 2 and FIG. 3.

The basepoint circuits 80A–80C in number one less than the total number of station basepoints respectively include the slidewires 81A–81C which are powered from separate supply sources exemplified by transformers 82A–82C. As indicated in FIG. 4, the slidewire 81A is mechanically coupled to slidewire 26A of network 25A (FIG. 1) so that the first basepoint of station S1 is simultaneously set into networks 25A and 80A: the slidewire 81B is mechanically coupled to slidewire 26B (FIG. 1) so that the second basepoint of station S1 is simultaneously set into networks 25B and 80B: and slidewire 81C is mechanically coupled to slidewire 26C so that the third basepoint of station S1 is simultaneously set into network 25C and 80C. Since this is a three-segment schedule, there is no need for a fourth slidewire coupled to slidewire 26D.

The relatively adjustable contacts 83A, 83B, 83C of the slidewires 81A, 81B, 81C are respectively connected to the fixed contacts 84A, 84B, 84C of the segment transfer switch 85 which is actuated by the schedule cam 18 or equivalent in accordance with total area generation. Thus, when the total area generation is in the first segment of the station loading schedule, the movable contact 86 of switch 85 engages the fixed contact 84A so that the output voltage $G_{S1}$ appearing between terminals 87A, 88A and representative of the desired generation for station S1 is the sum of the voltage $e_{S1}$ and the preset voltage $e_{11}$ corresponding with the first basepoint of the schedule for station S1. In like manner, when movable contact 86 engages fixed contact 84B, the output voltage $G_{S1}$ is the sum of any existing voltage $e_{S1}$ and the preset voltage $e_{12}$ corresponding with the second basepoint of the schedule for station S1. Similarly when the movable contact 86 is in engagement with fixed contact 84C, the output voltage $G_{S1}$ is the sum of any voltage $e_{S1}$ and the preset voltage $e_{13}$ corresponding with the third basepoint for station S1.

Thus, at all times the signal $G_{S1}$ represents the desired generation of station S1 to maintain its scheduled share of total area generation. A similar arrangement (not shown) of the basepoint circuits and the segment switch is provided for connection to each of the other participation slidewires 77B, 77C similarly to provide signals $G_{S2}$, $G_{S3}$ respectively representing the desired generation of stations S2 and S3. The desired generation signals $G_{S1}$, $G_{S2}$ and $G_{S3}$ may be transmitted over any suitable form of telemetering to generation stations of the area for control of their generation or they may be compared with signals representing actual generation of the stations and the resulting error signals transmitted to the respective stations for control of their generation to reduce the error signals to zero. When a station consists of a single generating unit, the transmitted signal may be utilized automatically to control the input to the station unit by varying the throttle valve or gate of the prime mover, directly or through a speed governor, or by varying the boiler input. Various known arrangements, including that shown in my aforesaid patent, are suited for utilizing such transmitted signal to control the generation of stations and units.

When the station comprises two or more units, an arrangement such as shown in FIGS. 2 and 3 may be utilized at the station to divide its generation requirement among the generating units upon the bases of unit-loading schedules similar to those of FIG. 1 except that the total generation is that of the station and that the individual generations are those of generating units. The preset breakpoints will now be those of total station generation and the preset basepoints will be those of individual generating units. The resulting desired generation signals of the units may each be utilized to control the generation of the unit as above briefly described. All of the preceding discussion of FIGS. 1 to 4 will apply except that it will be at station level rather than at area level. It is to be noted that with the arrangement of FIGS. 2 and 3, unlike that shown in my aforesaid patent, the multi-segment loading schedule is established without the use of preset participation setters, being preset instead by basepoint setters and by breakpoint setters, each of which may be calibrated to be direct reading in output. The participation values for each source are automatically computed and injected into the allocation circuits in the manner already described.

It should be noted that area breakpoints, being equal to the sum of corresponding station basepoints, need not be separately set as in FIG. 2, but may be derived from a summation of additional slidewires on the basepoint setters, as will be discussed later in conjunction with FIG. 5.

Equation 1 may be rewritten in the form $$(1A) \qquad G_s = b_d + (b_u - b_d)\left[\frac{G_A - X_d \pm N}{X_u - X_d}\right]$$

and in such form is solved by the computer circuit arrangement shown in FIG. 5 which utilizes a single servo-motor and which includes no breakpoint setters by taking advantage of the fact that the lower breakpoint of a particular segment is scheduled to the sum of the lower basepoints and that the upper breakpoint of that segment is equal to the sum of the upper basepoints. Thus, in setting up the loading schedules an operator need only set the station basepoints at area level and unit basepoints at station level.

The first basepoint circuits 90A–90C of FIG. 5, in number corresponding with the number of stations, respectively include the slidewires 91A–91C and are separately powered from suitable supply sources exemplified by transformers 92A–92C. The slidewire contacts 93A–93C are set relative to their respective slidewires each in accordance with the first basepoint of the schedule of the corresponding station. The outputs of the circuits 90A–90C, as indicated, are connected in series so that their joint output as measured between contact 93C and lead 94 corresponds with the sum of the first basepoints of the stations.

The second basepoint circuits 95A–95C respectively include the slidewires 96A–96C and are separately powered from supply sources exemplified by transformers 97A–97C. The contacts 98A–98C are set relative to their respective slidewires, each in accordance with the second basepoint of the corresponding station. The outputs of the circuits 95A–95C are connected in series so that their joint output as appearing between contact 98C and lead 94 corresponds with the sum of the second basepoints.

The third basepoint circuits 100A–100C respectively include the slidewires 101A–101C and are separately powered from supply sources exemplified by transformers 102A–102C. The contacts 103A–103C are set relative to their respective slidewires, each in accordance with the third basepoint of the corresponding station. The outputs of the circuits 100A–100C are connected in series so that the voltage between contact 103C and lead 94 represents the sum of the third basepoints.

The fourth basepoint circuits 105A–105C respectively include the slidewires 106A–106C and are separately powered from supply sources exemplified by transformers 107A–107C. The contacts 108A–108C are set relative to their respective slidewires, each in accordance with the fourth basepoint of the corresponding station. The outputs of the circuits 105A–105C are connected in series so that the voltage between contact 108C and lead 94 represents the sum of the fourth basepoints of the stations.

The output contacts 93C, 98C, 103C, 108C of the corresponding basepoint circuits 90C, 95C, 100C, 105C are respectively connected to the fixed contacts 110A–110D of the segment transfer switch 111. The movable contacts 112, 113 of switch 111 are connected to the terminals of slidewire 114 which is center-tapped or shunted by a center-tapped impedance 115. For each position of switch 111, the voltage from contact 112 to lead 94 represents $X_d$ and the voltage from contact 113 to lead 94 represents $X_u$.

Since in the circuit loop from contact 112 to lead 94 and back to contact 113 those voltages are in opposition, the voltage between the contacts 112, 113 represents the difference $X_u - X_d$. Specifically, with the switch 11 in its second segment position shown in FIG. 5, the voltage $E_2$ representing the difference $(X_3 - X_2)$ between the sum of the third basepoints of stations S1–S3 and the sum of the second basepoints of stations S1–S3 is applied to the slidewire 114. Similarly, when the switch 111 is in its first segment position, the slidewire 114 has applied to it the voltage $E_1$ representing the difference $(X_2 - X_1)$ between the sum of the second basepoints of stations S1–S3 and the sum of the first basepoints of stations S1–S3, and when the switch 111 is in its third segment position, the slidewire 114 has applied to it the voltage $E_3$ representing the difference $(X_4 - X_3)$ between the sum of the fourth basepoints of stations S1–S3 and the sum of the third basepoints of stations S1–S3.

The slidewire 114 and its center-tapped resistor form a network 116 which is included in network 65, which as in the system of FIG. 2, produces voltages $V_1$ and $V_2$ respectively representative of area requirement (N) and area regulation $(G_A - X_d)$. The servo-motor 117 under control of amplifier 118 adjusts the position of slidewire 114 to maintain balance of the algebraic sum of voltages $V_1$, $V_2$ and the unbalanced voltage of network 116 which is proportional to voltage $E_2$.

Thus, the position of contact 119 represents the quantity $$\frac{G_A - X_d \pm N}{X_u - X_d}$$

of Equation 1A

As now explained, this quantity is effectively multiplied for each segment of the loading schedule of each station, by a factor representing the difference between the upper and lower basepoints of that segment. In the network 120, the slidewires 121A–121D are set relative to their contacts 122A–122D in accordance with the successive basepoints of the loading schedule for station S1. The slidewires 123A–123D are set relative to their contacts 124A–124D in accordance with the successive basepoints of the loading schedule for station S2. The slidewires 125A–125D are set relative to their contacts 126A–126D in accordance with the successive basepoints of the loading schedule for station S3.

The corresponding basepoint slidewires for each station are in parallel to one another so that the voltage between the successive pairs of slidewire contacts is proportional to the difference between the corresponding basepoints of that station. For example, the voltage $e_{31}$ between contacts 126B and 126A is proportional to $(b_2 - b_1)$: the voltage $e_{32}$ between contacts 126C and 126B is proportional to $(b_3 - b_2)$: and the voltage $e_{33}$ between contacts 126D and 126C is proportional to $(b_4 - b_3)$. To the end that the current through each of the aforesaid basepoint slidewires of network 120 be proportional to the quantity $$\frac{G_A - X_d \pm N}{X_u - X_d}$$

they are supplied from the network 130. This network includes slidewire 131 which is effectively center-tapped by the center-tapped shunt resistor 131. The slidewire 131 is powered from a suitable power supply source exemplified by transformer 133 and its contact 134 is adjustable by the servo-motor 117. Thus, the output voltage $e$ applied to all of the slidewires of network 120 is proportional to the aforesaid quantity.

Thus, the aforesaid voltages $e_{31}$, $e_{32}$, $e_{33}$ respectively represent the difference between the successive pairs of basepoints for station S3 times the aforesaid quantity. Specifically:

$$e_{31} \text{ represents } (b_2 - b_1)\left[\frac{G_A - X_1 \pm N}{X_2 - X_1}\right]$$

$$e_{32} \text{ represents } (b_3 - b_2)\left[\frac{G_A - X_2 \pm N}{X_3 - X_2}\right]$$

and $$e_{33} \text{ represents } (b_4 - b_3)\left[\frac{G_A - X_3 \pm N}{X_4 - X_3}\right]$$

Figure 6:
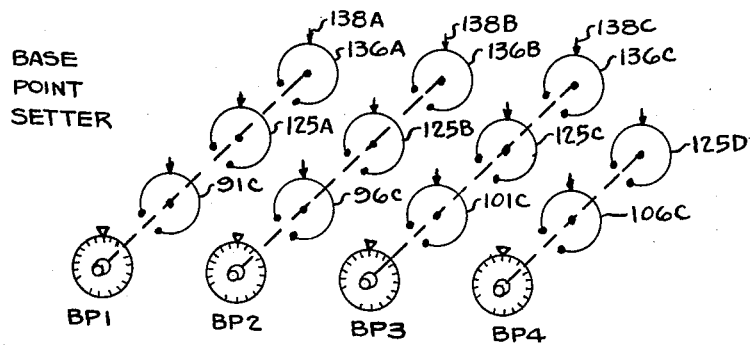
FIG. 6 illustrates an arrangement for presetting the source basepoints into various networks of the system of FIG. 5.

To obtain for each of the schedule segments a voltage which represents the desired generation $G_{S3}$ for station S3 as defined by Equation 1A, there is added to each of the aforesaid voltages, $e_{31}$, $e_{32}$, $e_{33}$ a voltage which represents the lower basepoint of the corresponding segment. The basepoint circuits 135A and 135C, in number one less than the total number of basepoints for station S3, respectively include the slidewires 136A–136C which are powered from separate supply sources exemplified by transformers 137A–137C. As indicated in FIG. 6, the slidewire 136A is mechanically coupled to slidewires 91C and 125A so that the first basepoint of station S3 is simultaneously preset in networks 135A, 90C and 120: the slidewire 136B is mechanically coupled to slidewires 96C and 125B so that the second basepoint of station S3 is simultaneously preset in networks 135B, 95C and 120; and the slidewire 136C is mechanically coupled to slidewires 101C and 125C so that the third basepoint of station S3 is simultaneously preset in networks 135C, 100C and 120.

The relatively adjustable contacts 138A–138C of slidewires 136A–136C of networks 135A–135C are respectively connected to the fixed contacts 139A–139C of the segment transfer switch 140 which is actuated by the schedule cam 18 or equivalent device stepped in accordance with total area generation. The relatively adjustable contacts 126A–126D of the slidewires 125A–125D of network 120 are connected to the fixed contacts 141A–141D of transfer switch 140. Thus, when the total area generation is in the first segment of the loading schedule for station S3, the movable contact 142 of switch 140 engages the fixed contacts 139A, 141A and movable contact 143 of switch 140 engages fixed contact 141B so that the output voltage $G_{S3}$ between terminals 144, 145 is the sum of the aforesaid voltage $e_{31}$ and a preset voltage $e_{3a}$ corresponding with the first basepoint for station S3. For the second segment of the loading schedule for station S3, the movable contact 142, as shown, engages the fixed contacts 139B and 141B and the movable contact 143 engages fixed contact 141C so that the output voltage $G_{S3}$ is the sum of the aforesaid voltage $e_{32}$ and a preset voltage $e_{3b}$ corresponding with the second basepoint for station S3. For the third segment of the loading schedule for station S3, the movable contact 142 of switch 140 engages the fixed contacts 141C and 139C and the movable contact 143 engages the fixed contact 141D so that the output voltage $G_{S3}$ is the sum of the aforesaid voltage $e_{33}$ and a preset voltage $e_{3c}$ corresponding with the third basepoint for station S3.

Thus, at all times the signal $G_{S3}$ represents the desired generation of station S3 to keep it on its schedule for desired participation in the total area generation and area requirement. A similar arrangement (not shown) of basepoint circuits and a segment transfer switch is provided for the basepoint slidewires 121A–121D for station S1 and is provided for basepoint slidewires 123A–123D for station S2 similarly to provide station control signals $G_{S1}$, $G_{S2}$ respectively representing the desired generation of stations S1 and S2. The signals $G_{S1}$, $G_{S2}$, $G_{S3}$ may be transmitted over any suitable form of telemetering channel to the corresponding stations of the area for control of their individual generations. When a station consists of a single generating unit, such station control signal may be used to control the input to the generating unit of the station by varying the throttle valve or gate of its prime mover directly or through a speed governor or by varying boiler input. When the station comprises two or more generating units, an arrangement similar to that shown in FIG. 5 may be utilized at the station to divide its total generation among the units of that station on the basis of unit loading schedules similar to those of FIG. 1 except that the total generation is that of the station and that the individual generations are those of its generating units. In such case, the preset basepoints will be those of the generating units and all of the preceding discussion of FIGS. 5 and 6 will apply except that it will be for station level rather than area level.

With the arrangement of FIG. 5 as used at either area or station level, the multi-segment load schedule is established solely by basepoint setters, which may be calibrated directly in source output.

Figure 7:
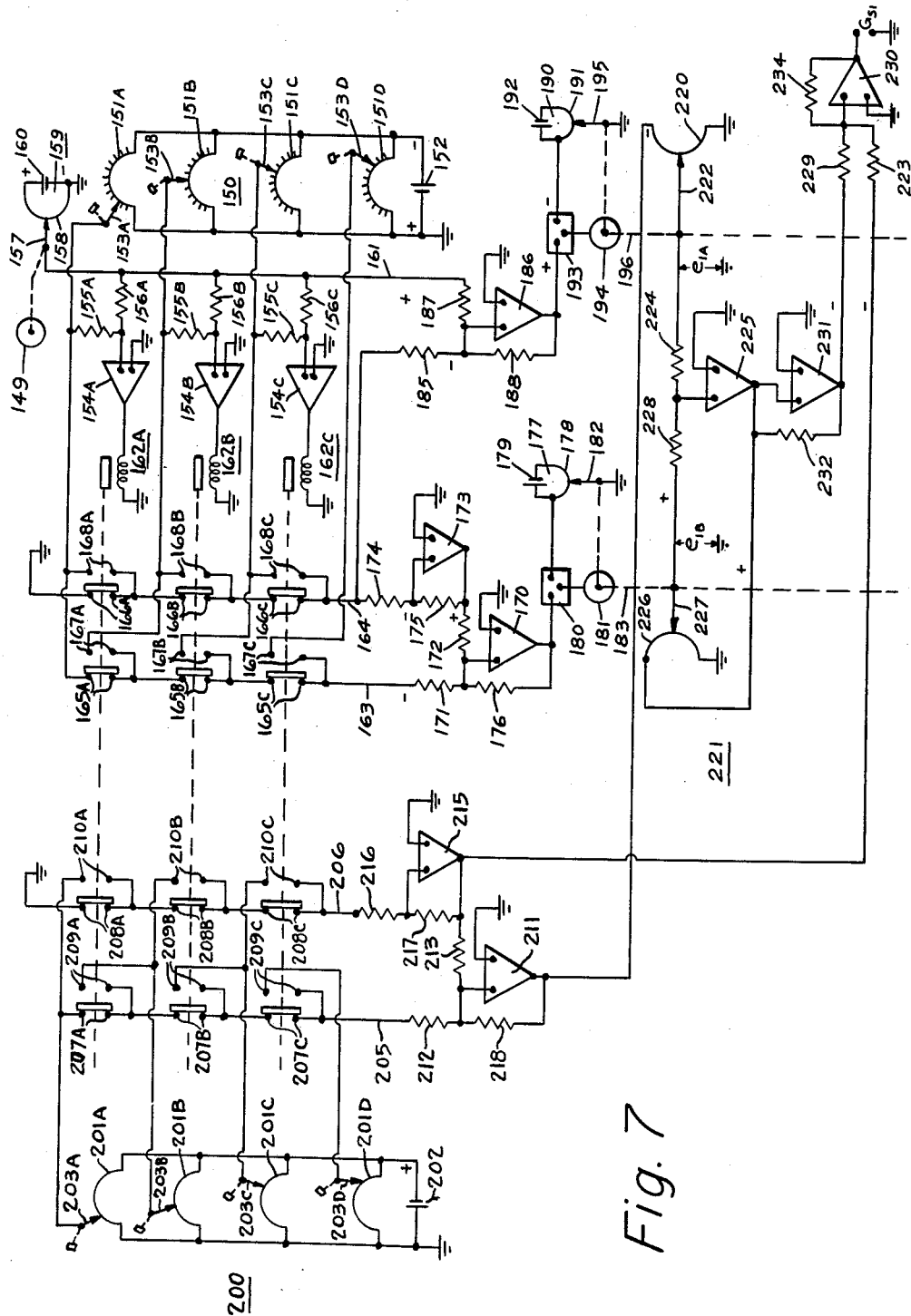
FIG. 7 is the circuit diagram of another system embodying the invention to provide signals respectively representing the required generation of the individual sources to put them on schedule.

In the arrangement of FIG. 7, like that of FIG. 2, the multi-segment loading schedule is established at area level by area breakpoint setters and station basepoint setters and is established at station level by station breakpoint setters and unit basepoint setters.

The area breakpoint network 150 comprises the slidewires 151A–151D, in number corresponding with the numbed of adjustable area breakpoints, connected in parallel across a suitable supply source exemplified by battery 152. The slidewires 151A–151D are each calibrated in terms of megawatts or other suitable unit of power and are preset with respect to their relatively adjustable contacts 153A–153D in accordance with the area generation breakpoints of the loading schedules to be put into effect.

The amplifiers 154A–154C have their ungrounded input terminals respectively connected through input resistors 155A–155C to the slidewire contacts 153A–153C. These input terminals are also respectively connected through input resistors 156A–156C to the contact 157 of slidewire 158 which is powered from a suitable supply source exemplified by battery 160. The position of contact 157 relative to its slidewire 158 is controlled by the meter 149 which is responsive to the existing area generation as modified by any existing area requirement, i.e., to $(G_A \pm N)$ or total generation required of the area. Otherwise stated, the output voltage of network 159 as applied to input line 161 common to amplifiers 154A–154C varies with the total generation required of the area, hereinafter referred to as area destination, and the output voltages of network 150 as respectively applied to the amplifiers 154A–154C represent the successive area breakpoints.

Thus, in the input circuit of each amplifier 154A–154C there are compared two signals respectively representing the corresponding area breakpoint and the area destination as above defined. When the magnitude of the area breakpoint signal is the lesser of the two, the amplifier output energizes the corresponding one of the relays 162A–162C respectively in the output circuits of amplifiers 154A–154C for purposes now explained.

With all relays deenergized, as is true when area destination is less than the first area breakpoint, the voltage on bus 163 represents the first area breakpoint and the bus 164 is at ground potential. For this state of the relays, the bus 163 is connected to the movable contact 153A of the first area breakpoint slidewire 151A through a path provided by the normally-closed contacts 165A, 165B, 165C of the relays; the bus 164 is connected to ground through the normally-closed contacts 166A, 166B, 166C of the relays.

With relay 162A energized and relays 162B, 162C deenergized, as is true when area destination is greater than the area breakpoint set by contact 153A but less than the area breakpoint set by contact 153B, the voltage on bus 163 represents the next higher area breakpoint and the voltage on bus 164 represents the next lower area breakpoint. For this state of the relays, the bus 163 is connected to the movable contact 153B of the second breakpoint slidewire 151B through the normally-closed contacts 165C, 165B of relays 162C, 162B and the now closed back contacts 167A of relay 162A; and the bus 164 is connected to the movable contact 153A of the first breakpoint slidewire 151A through the normally-closed contacts 166C, 166B of relays 162C, 162B and the now closed back contacts 168A of relay 162A.

With relays 162A, 162B energized and relay 162C deenergized, as is true when area destination is greater than the breakpoint set by contact 153B but less than the breakpoint set by contact 153C, the voltage on bus 163 again represents the next higher breakpoint and the voltage on bus 164 represents the next lower breakpoint. For this state of the relays, the bus 163 is connected to the movable contact 153C of the breakpoint slidewire 151C through the normally-closed contacts 165C of relay 162C and the now closed back contacts 167B of relay 162B: and the bus 164 is connected to the movable contact 153B of the second breakpoint slidewire 151B through the normally-closed contacts 166C of relay 162C and the now closed back contacts 168B of relay 162B.

With all relays deenergized, as is true when area destination is greater than the breakpoint set by contact 153, the voltage on bus 163 represents the next higher breakpoint and the voltage on bus 164 represents the next lower breakpoint. For this stage of the relays, the bus 163 is connetced to the movable contact 153D of the breakpoint slidewire 151D through the now closed back contacts 167C of relay 162C: and the bus 164 is connected to the movable contact 153C of the breakpoint slidewire 151C through the now closed back contacts 168C of relay 162C.

From the foregoing it should be clear that for each segment of the loading schedule, the voltage on bus 163 represents the upper breakpoint $X_u$ of that segment and that the voltage on bus 164 represents the lower breakpoint $X_d$ of that segment.

The $X_u$ voltage on bus 163 is applied to the ungrounded input terminal of amplifier 170 through input or summing resistor 171. The $X_d$ voltage on bus 164, after reversal of its polarity, is also applied to the ungrounded input terminal of amplifier 170 through input or summing resistor 172. The aforesaid polarity reversal of the $X_d$ voltage is effected by the operational amplifier 173. The unreversed $X_d$ voltage is applied through input resistor 174 to the ungrounded input terminal of amplifier 173. A negative feedback resistor 175 connected from the output terminal of amplifier 173 to its ungrounded input terminal insures a linear proportional relationship between its input and output voltages respectively corresponding with $-X_d$ and $+X_d$.

The net input voltage of amplifier 170 thus corresponds in magnitude with the difference between the upper and lower breakpoints of the schedule segment in use. A linear proportional relationship between such net input voltage and the output voltage of amplifier 170 is insured by the negative feedback resistor 176.

The output voltage of the operational amplifier 170 is opposed to the effective output voltage of the network 177 including the slidewire 178 and a suitable power source exemplified by battery 179. When these voltages are not in balance, the output of the amplifier 180 to which they are applied energizes the servo-motor 181 to effect a balancing adjustment of contact 182 relative to its slidewire 178. Thus, the angular position of shaft 183 which is concurrently adjusted by servo-motor 181, represents the difference $(X_u - X_d)$ between the upper and lower breakpoints of the schedule segment in effect. As will later appear, this shaft introduces the quantity $(X_u - X_d)$ into computer circuits respectively corresponding with the stations of the area.

The unreversed $X_d$ voltage on bus 164 is applied through input resistor 185 to the ungrounded input terminal of amplifier 186. To the same terminal, there is applied through input resistor 187 the voltage on bus 161 which, as above stated, represents area destination. Thus, the net input of amplifier 186 represents the difference between area destination and the next lower area breakpoint. To insure linear proportionality between such net input and the output of amplifier 186, the resistor 188 is connected from the output terminal to the ungrounded input terminal to provide negative feedback.

The output voltage of the operational amplifier 186 is opposed to the effective output voltage of the network 190 including the slidewire 191 and a suitable power source exemplified by battery 192. When these voltages are not in balance, the output of amplifier 193 to which they are applied energizes the servo-motor 194 to effect balancing adjustment of contact 195 relative to its slidewire 191. Thus, the angular position of shaft 196, which is concurrently adjusted by servo-motor 194, represents the difference $(G_A \pm N - X_d)$ between area destination and the next lower breakpoint. As will later appear, this shaft introduces the quantity $(G_A \pm N - X_d)$ into circuits which respectively compute the desired generations of the stations of the area. Since such computer circuits are identical, only the one for station S1 need be illustrated and described.

The station basepoint network 200 comprises the slidewires 201A–201D, in number corresponding with the number of adjustable station basepoints, connected in parallel across a suitable supply source exemplified by battery 202. The slidewires 201A–201D are each calibrated in terms of megawatts or other unit of power and are preset with respect to their respective relatively adjustable contacts 203A–203D in accordance with the basepoints of the station-loading schedule in effect.

With all of relays 162A–162C deenergized, the voltage on bus 205 represents the first adjustable basepoint of station S1 and the bus 206 is at ground potential. For this state of the relays, the bus 205 is connected to the contact 203A of the basepoint slidewire 201 through the normally-closed contacts 207A–207C of the relays: the bus 206 is connected to ground through the normally-closed contacts 208A–208C of the relays.

With relay 162A energized and relays 162B, 162C deenergized i.e., when the area destination is greater than the setting of contact 151A, the voltage on bus 205 represents the upper basepoint of station S1 and the voltage on bus 206 represents the lower basepoint of station S1 for the applicable segment of the loading curve. For this state of the relays, the bus 205 is connected to the contact 203B of the basepoint slidewire 201B through the normally-closed contacts 207C, 207B of relays 162C, 162B and the now closed back contacts 209A of relay 162A: the bus 206 is connected to the contact 203A of the basepoint slidewire 201A through the normally-closed contacts 208C, 208B of relays 162C, 162B and the now closed back contacts 210A of relay 162A.

With relays 162A, 162B energized and relay 162C deenergized, the voltage on bus 205 again represents the upper base point of station S1 and the voltage on bus 206 represents the lower basepoint of station S1 of the applicable segment of the loading curve. For this state of the relays, the bus 205 is connected to the contact 203C of the basepoint slidewire 201C through the normally-closed contacts 207C of relay 162C and the now closed back contacts 209B of relay 162B: the bus 206 is connected to the contact 203B of the basepoint slidewire 201B through the normally-closed contacts 208C of relay 162C and the now closed back contacts 210B of relay 162B.

With all of the relays 162A–162B energized, the voltage on bus 205 again represents the upper basepoint of station S1 and the voltage on bus 206 represents the lower basepoint of station S1. For this state of the relays, the bus 205 is connected to contact 203D of the basepoint slidewire 201D through the now closed back contacts 209C of relay 162C: the bus 206 is connected to the contact 203C of the third basepoint slidewire 201C through the now closed back contacts 210C of relay 162C.

From the foregoing, it should be clear that for each segment of the loading schedule for station S1, the voltage on bus 205 represents the upper basepoint $b_u$ of that segment and that the voltage on bus 206 represents the lower basepoint $b_d$ of that segment.

The $b_u$ voltage on bus 205 is applied to the ungrounded input terminal of amplifier 211 through input resistor 212. The $b_d$ voltage on bus 206 is also applied, after reversal of its polarity, to the ungrounded input terminal of amplifier 211 through input resistor 213. The aforesaid polarity-reversal of the $b_d$ voltage is effected by the operational amplifier 215. The unreversed $b_d$ voltage is applied through input resistor 216 to the ungrounded terminal of amplifier 215. The negative feedback resistor 217 insures a linear proportional relationship between the input and output voltages of amplifier 215, such voltages respectively corresponding with $+b_d$ and $-b_d$.

The net input voltage of amplifier 211 thus corresponds in magnitude with the difference $(b_u - b_d)$ between the upper and lower basepoints of that segment of the station loading schedule which is in use. A linear proportional relationship between the net input voltage and the output voltage of amplifier 211 is insured by the negative-feedback resistor 218.

The output voltage of operational amplifier 211 is applied across the slidewire 220 of the computer circuit 221. The position of this slidewire relative to its contact 222 is determined by the angular position of shaft 196 of servo-motor 194. Thus, the effective output voltage $e_{1A}$ of slidewire 220 is proportional to the quantity $$(b_u - b_d)(G_A \pm N - X_d)$$

The effective output voltage $e_{1A}$ of slidewire 220 is applied to the ungrounded terminal of the amplifier 225 through the input resistor 224. The output voltage of amplifier 225 is applied to slidewire 226 whose contact 227 is positioned relative thereto in accordance with the angular position of shaft 183 of servo-motor 181. Thus, the effective output voltage $e_{1B}$ of slidewire 226 as thus described is proportional to the quantity $(X_u - X_d)$.

The effective output voltage $e_{1B}$ of slidewire 226 is applied through input resistor 228 to the ungrounded input terminal of amplifier 225. Thus, the output voltage $e_{1B}$ is a negative-feedback voltage whose magnitude depends upon the feedback factor $(X_u - X_d)$ and the output voltage of amplifier 225 represents the quantity $$+\frac{(b_u - b_d)(G_A \pm N - X_d)}{(X_u - X_d)}$$

After reversal of its polarity, the output voltage of amplifier 225 is applied through input resistor to the ungrounded input terminal of amplifier 230. Such reversal of polarity is effected by the amplifier 231 to whose ungrounded input terminal the output voltage of amplifier 225 is applied. The negative-feedback resistor 232 of amplifier 231 insures linear proportionality of its input and output voltages so that the latter as applied through input resistor 229 to the ungrounded input terminal of amplifier 230 represents the quantity $$-\frac{(b_u - b_d)(G_A \pm N - X_d)}{(X_u - X_d)}$$

To the ungrounded input terminal of amplifier 230 is also applied, through input resistor 223, the output voltage of the operational amplifier 215 which, as above explained, represents the lower basepoint of that segment of the station loading schedule which is in effect. Thus, the net input to the amplifier 230 represents the quantity $$-b_d - (G_A - X_d \pm N)\left(\frac{b_u - b_d}{X_u - X_d}\right)$$

Because of the reversal of polarity effected by amplifier 230 and because of the linearity insured by its negative-feedback resistor 234, the output voltage $G_S$ of amplifier 230 may be expressed by Equation 1 as solved for the desired generation of station S1.

For each additional station of the area, there is a computer network corresponding with computer network 221 in which slidewires corresponding with slidewires 220 and 226 are positioned with respect to their adjustable contacts by the servomotor shafts 196, 183 respectively. Also for each additional station, each of the relays 162A–162C is provided with additional sets of contacts for staggered stepping connection of basepoint slidewires to provide for the associated computer circuit two input voltages, one corresponding with the difference $b_u-b_d$ of the upper and lower basepoints of the station schedule in effect and the magnitude $b_d$ of the lower basepoint of that segment.

In all of the arrangements described, as applied at area level, the desired allocation of generation among the stations for each segment of this area loading schedule is automatically established by presetting of the station basepoints alone or by presetting the station basepoints and the area breakpoints all of which may be calibrated to be direct reading in megawatts or equivalent. None of the arrangements described requires any presetting of participation slidewires individual to the stations of the area. Such advantage also obtains when any of the arrangements described are utilized at station level for allocation of station generation among the generating units of that station in accordance with multi-segment unit-loading schedules.

It will also be understood that the total generation desired from a source may be computed in accordance with the following variation of Equation 1.

$$G_S - b_u - [X_u - (G_A \pm N)]\left(\frac{b_u-b_d}{X_u-X_d}\right)$$

To solve this variation of Equation 1 with the arrangement shown in FIGS. 2, 3 or FIG. 5, the area regulation term would be $(X_u-G_A)$ as obtained by using the sum of the upper basepoints rather than $(G_A-X_d)$ obtained by using the sum of the lower basepoints and the station basepoint included in the computation would be the upper rather than the lower basepoint.

For this variation of Equation 1 with the arrangement shown in FIG. 7, the area breakpoint input of amplifier 186 would be from the upper breakpoint bus 163 rather than the lower breakpoint bus 164, and the basepoint input to amplifier 230 would be derived from the upper basepoint bus 205 rather than from the lower basepoint bus 206.

What is claimed is:

1. A system for allocating the total generation required of a group of generating sources among said sources in accordance with loading schedules comprising means for producing a variable signal representing the total generation of the group modified by the change in total generation required to maintain the total generation on schedule, means for producing signals representing the upper and lower basepoint generations of the individual sources and the sums of the upper and lower basepoint generations of said group of sources, and generation-allocation means for deriving from the aforesaid signals a plurality of generation-allocation signals each representing the desired generation of a source and having two components, one representing one of the basepoints of that source and the second representing the product of the deviation of said required total generation from the sum of said one basepoint and the corresponding basepoints of the remainder of said sources times the ratio $$\frac{b_u-b_d}{X_u-X_d}$$

where $b_u$=upper basepoint of corresponding source
$b_d$=lower basepoint of corresponding source
$X_u$=sum of upper basepoints of all sources
$X_d$=sum of lower basepoints of all sources 2. A system for allocating the total generation required of a group of generating sources among said sources in accordance with loading schedules comprising means for producing a variable signal representing the total generation of the group modified by the change in total generation required to maintain the total generation on schedule, means for producing signals representing the upper and lower basepoint generations of the individual sources and the sums of the upper and lower basepoint generations of said group of sources, and generation-allocation means for deriving from the aforesaid signals a plurality of generation-allocation signals each representing $$b_d+(G_A-X_d\pm N)\left(\frac{b_u-b_d}{X_u-X_d}\right)$$

where $b_d$=lower basepoint of corresponding source
$b_u$=upper basepoint of corresponding source
$X_d$=sum of lower basepoints of all sources
$X_u$=sum of upper basepoints of all sources
$G_A$=total generation of group
$N$=required change of $G_A$.

3. A system for allocating the total generation required of a group of generating sources among said sources in accordance with loading schedules comprising means for producing a variable signal representing the total generation of the group modified by the change in total generation required to maintain the total generation on schedule, means for producing signals representing the upper and lower basepoint generations of the individual sources and the sums of the upper and lower basepoint generations of said group of sources, and generation-allocation means for deriving from the aforesaid signals a plurality of generation-allocation signals each representing $$b_u-[X_u-(G_A\pm N)]\left(\frac{b_u-b_d}{X_u-X_d}\right)$$

where $b_d$=lower basepoint of corresponding source
$b_u$=upper basepoint of corresponding source
$X_d$=sum of lower basepoints of all sources
$X_u$=sum of upper basepoints of all sources
$G_A$=total generation of group
$N$=required change of $G_A$.

4. A system for allocating total generation among generating sources of a group in accordance with a loading schedule comprising means for producing a variable signal representative of the total generation to be allocated, means for producing signals representative of the upper and lower basepoint generations of individual sources and the sums of the upper and lower basepoint generations of said group of sources, and generation-allocation means for deriving from said signals a plurality of generation-allocation signals each representing the sum of the lower basepoint of the corresponding source plus the product of the deviation of the total generation to be allocated from the sum of the lower basepoints times the ratio $$\frac{b_u-b_d}{X_u-X_d}$$

where $b_d$=lower basepoint of corresponding source
$b_u$=upper basepoint of corresponding source
$X_d$=sum of lower basepoints of the sources
$X_u$=sum of upper basepoints of the sources.

5. A system for allocating total generation among generating sources of a group in accordance with a loading schedule comprising means for producing a variable signal representative of the total generation to be allocated, means for producing signals representative of the upper and lower basepoint generations of individual sources and the sums of the upper and lower basepoint generations of said group of sources, computer means for deriving from said signals a plurality of generation-allocation signals each representing the product of the deviation of total generation to be allocated from the sum of the lower basepoints times the ratio $$\frac{b_u - b_d}{X_u - X_d}$$

where $b_d$ = lower basepoint of corresponding source
$b_u$ = upper basepoint of corresponding source
$X_d$ = sum of lower basepoints of the sources
$X_u$ = sum of upper basepoints of the sources, and means for adding to each of said generation-allocation signals a signal representative of the lower basepoint of the corresponding source to produce a signal representative of the generation required of that source to put it on schedule.

6. A system for allocating total generation among generating sources of a group in accordance with a loading schedule comprising means for producing a variable signal representative of the total generation to be allocated, means for producing signals each representative of the difference between the upper and lower basepoint generations of a corresponding one of the individual sources, means for producing a signal representative of the difference between the sum of the upper basepoint generations of said sources and the sum of the lower basepoint generations of said sources, and generation-allocation means for deriving from said signals a plurality of signals each representing the product of the deviation of total generation to be allocated from the sum of corresponding ones of the basepoints times the ratio $$\frac{b_u - b_d}{X_u - X_d}$$

where $b_u - b_d$ = difference between upper and lower basepoints of corresponding source
$X_u - X_d$ = difference between sums of upper and lower basepoints of all sources.

7. A system for allocating total generation among generating sources of a group in accordance with a loading schedule comprising means for producing a variable signal representative of the total generation to be allocated, means for producing signals each representative of the difference between the upper and lower basepoint generations of a corresponding one of the individual sources, means for producing a signal representative of the difference between the sum of the upper basepoint generations of said sources and the sum of the lower basepoint generations of said sources, and generation-allocation means for deriving from said signals a plurality of signals each representing the product of the deviation of total generation to be allocated from the sum of the lower basepoints times the ratio $$\frac{b_u - b_d}{X_u - X_d}$$

where $b_u - b_d$ = difference between upper and lower basepoints of corresponding source
$X_u - X_d$ = difference between sums of upper and lower basepoints of all sources.

8. A system for allocating total generation among generating sources of a group in accordance with a loading schedule comprising means for producing a variable signal representative of the total generation to be allocated, means for producing signals each representative of the difference between the upper and lower basepoint generations of a corresponding one of the individual sources, means for producing a signal representative of the difference between the sum of the upper basepoint generations of said sources and the sum of the lower basepoint generations of said sources, generation-allocation means for deriving from said signals a plurality of signals each representing the product of the deviation of total generation to be allocated from the sum of corresponding ones of the basepoints times the ratio $$\frac{b_u - b_d}{X_u - X_d}$$

where $b_u - b_d$ = difference between upper and lower basepoints of corresponding source
$X_u - X_d$ = difference between sums of upper and lower basepoints of all sources, and means for adding to each of said generation-allocation signals a signal representative of said one basepoint of the corresponding source to produce a signal representative of the generation required of that source to put it on schedule.

9. A system for allocating total generation among generating sources of a group in accordance with a loading schedule comprising means for producing a variable signal representative of the total generation to be allocated, means for producing signals each representative of the difference between the upper and lower basepoint generations of a corresponding one of the individual sources, means for producing a signal representative of the difference between the sum of the upper basepoint generations of said sources and the sum of the lower basepoint generations of said sources, generation-allocation means for deriving from said signals a plurality of signals each representing the product of the deviation of total generation to be allocated from the sum of the lower basepoints times the ratio $$\frac{b_u - b_d}{X_u - X_d}$$

where $b_u - b_d$ = difference between upper and lower basepoints of corresponding source
$X_u - X_d$ = difference between sums of upper and lower basepoints of all sources, and means for adding to each of said generation-allocation signals a signal representative of the lower basepoint of the corresponding source to produce a signal representative of the generation required of that source to put it on schedule.

10. A system for allocating total generation among generating sources of a group in accordance with a loading schedule comprising means for producing signals representative of the upper and lower basepoint generations of the individual sources, means for producing signals representative of the upper and lower group breakpoints, means for deriving from said signals a plurality of ratio signals each representing the ratio $$\frac{b_u - b_d}{X_u - X_d}$$

where $b_u - b_d$ = difference between upper and lower basepoints of corresponding source
$X_u - X_d$ = difference between upper and lower breakpoints, means for producing a variable signal representative of the total generation to be allocated, and means for combining said variable signal with each of said ratio signals to produce a plurality of generation-allocation signals respectively representative of the extent to which the generation of each of said sources should be above its lower basepoint.

11. A system for allocating total generation among generating sources of a group in accordance with a loading schedule comprising means for producing signals representative of the upper and lower basepoint generations of the individual sources, means for producing fixed signals representative of the upper and lower group breakpoints, means for deriving from said signals a plurality of ratio signals each representing the ratio $$\frac{b_u - b_d}{X_u - X_d}$$

where $b_u - b_d$ = difference between upper and lower basepoints of corresponding source $X_u - X_d$ = difference between upper and lower breakpoints, means for producing a variable signal representative of the total generation to be allocated, means for combining said variable signal with each of said ratio signals to produce a plurality of generation-allocation signals respectively representative of the extent to which the generation of each of said sources should be above its lower basepoint, and means for adding to each of said generation-allocation signals a signal representative of the lower basepoint of the corresponding source to produce a signal representative of the generation required of that source to put it on schedule.

12. A system for allocating the total generation required of a group of generating sources among said sources in accordance with a multi-segment loading schedule comprising means for producing a variable signal representing the total generation of the group modified by the change in total generation required to maintain the total generation on schedule, means for producing signals representing the basepoint generations of the individual sources and the sums of the basepoint generations of the sources of said groups, switching means responsive to the transition of total generation from one schedule segment to the next to select the signals corresponding with the upper and lower basepoints of said next schedule segment, and generation-allocation means for deriving from said variable signal and the signals selected by said switching means a plurality of generation allocation signals each representing the desired generation of a source and having two components, one representing one of the basepoints of that source and the other representing the product of the deviation of said required total generation from the sum of said one basepoint and the corresponding basepoints of the remainder of said sources times the ratio $$\frac{b_u - b_d}{X_u - X_d}$$

where $b_u$ = upper basepoint of corresponding source
$b_d$ = lower basepoint of corresponding source
$X_u$ = sum of upper basepoints of all sources
$X_d$ = sum of lower basepoints of all sources.

13. A system for allocating total generation among generating sources of a group in accordance with a multi-segment loading schedule comprising means for producing a variable signal representative of the total generation to be allocated, means for producing signals representing the basepoint generations of the individual sources and the sums of the basepoint generations of said sources, switching means responsive to the transition of total generation from one schedule segment to the next to select the signals corresponding with the upper and lower basepoints of said next schedule segment, and generation-allocation means for deriving from said variable signal and the signals selected by said switching means a plurality of generation-allocation signals each representing the sum of the lower basepoint of the corresponding source for the schedule segment in effect plus the product of the deviation of total generation to be allocated from the sum of the lower basepoints times the ratio $$\frac{b_u - b_d}{X_u - X_d}$$

where $b_d$ = lower basepoint of corresponding source for schedule segment in effect
$b_u$ = upper basepoint of corresponding source for schedule segment in effect
$X_d$ = sum of lower basepoints of the sources for schedule segment in effect
$X_u$ = sum of upper basepoints of the sources for schedule segment in effect.

14. A system for allocating total generation among generating sources of a group in accordance with a multi-segment loading schedule comprising means for producing a variable signal representative of the total generation to be allocated, means for producing signals representative of the basepoint generations of the individual sources and the sums of the basepoint generations of said sources, switching means responsive to the transition of total generation from one schedule segment to the next to select the signals corresponding with the upper and lower basepoints of said next schedule segment, and generation-allocation means for deriving from said variable signal and the signals selected by said switching means a plurality of generation-allocation signals each representing the product of the deviation of total generation to be allocated from the sum of the lower basepoints times the ratio $$\frac{b_u - b_d}{X_u - X_d}$$

where $b_d$ = lower basepoint of corresponding source for schedule segment in effect
$b_u$ = upper basepoint of corresponding source for schedule segment in effect
$X_d$ = sum of lower basepoints of the sources for schedule segment in effect
$X_u$ = sum of upper basepoints of the sources for schedule segment in effect, and means for adding to each of said generation-allocation signals a signal representative of the lower basepoint of the corresponding source to produce a signal representative of the generation required of that source to put it on the schedule segment in effect.

15. A computer system for allocating the total output of a group of sources among said sources in accordance with a schedule comprising means for producing a variable signal varying in accordance with said total output, means for producing signals representing upper and lower limits of the outputs of the individual sources and the sums of the upper and lower limits of the sources, and allocation means for deriving from the aforesaid signals the desired output of a source and having two components, one representing one of the limits of that source and the second representing the product of the deviation of said total output from the sum of one limit and the corresponding limits of the remainder of said sources times the ratio $$\frac{b_u - b_d}{X_u - X_d}$$

where $b_u$ = upper limit of corresponding source
$b_d$ = lower limit of corresponding source
$X_u$ = sum of upper limits of said sources
$X_d$ = sum of lower limits of said sources.

16. A computing system for producing an output signal related to a variable quantity to be kept on a schedule having coordinates along X and Y axes comprising means for producing a variable signal representative of said quantity, means for producing signals representative of the upper and lower limits of said variable quantity on the X axis and for producing signals representative of the upper and lower limits of said output signal on the Y axis, and means for deriving from said signals an output signal which varies in accordance with said variable quantity and having two components, one representing one of said limits on the Y axis and the other representing the product of the deviation of said quantity from the corresponding limit on the X axis times the ratio $$\frac{b_u - b_d}{X_u - X_d}$$

where $b_u$ = upper limit on Y axis
$b_d$ = lower limit on Y axis
$X_u$ = upper limit on X axis
$X_d$ = lower limit on X axis.

17. A system for allocating the generation required of a group of generating sources among said sources in accordance with source output versus group total output loading schedules having at least one group of segments comprising means for presetting said schedules including basepoint setters and group breakpoint setters, said setters each being calibrated in terms of generation units, said basepoint setters each producing a signal representative of a corresponding basepoint and unaffected by any other basepoint setting, said group breakpoint setters each producing a signal representative of a corresponding breakpoint and unaffected by any other breakpoint setting, means for producing a variable signal representative of the total generation required of said group of sources, and computing means for deriving from said preset and variable signals a plurality of signals respectively representing the desired generations of the different sources and each corresponding with $$b_d + (G_A - X_d \pm N)\left(\frac{b_u - b_d}{X_u - X_d}\right)$$

where $b_d$ = lower basepoint of corresponding source for schedule segment in effect
$b_u$ = upper basepoint of corresponding source for schedule segment in effect
$X_d$ = lower breakpoint of group of sources for schedule segment in effect
$X_u$ = upper breakpoint of group of sources for schedule segment in effect
$G_A$ = total generation of group of sources
$N$ = required change of $G_A$.

18. A system for allocating the total generation required of a group of generating sources among said sources in accordance with loading schedules comprising means for producing a variable signal representative of the total generation to be allocated, means calibrated in generation units and preset to produce signals representative of the upper and lower basepoint generations of individual sources and the sums of the upper and lower basepoint generations of said group of sources, computing means for deriving from said variable and preset signals a plurality of signals respectively representing the desired generations of the different sources and each corresponding with $$b_d + (G_A - X_d \pm N)\left(\frac{b_u - b_d}{X_u - X_d}\right)$$

where $b_d$ = lower basepoint of corresponding source
$b_u$ = upper basepoint of corresponding source
$X_d$ = sum of lower basepoints of all sources
$X_u$ = sum of upper basepoints of all sources
$G_A$ = total generation of group
$N$ = required change of $G_A$, means for producing signals respectively representing the actual generation of the different sources, means for comparing said desired generation signals with said actual generation signals to produce error signals respectively representing the difference between the desired generation and actual generation of each source, and means for controlling the generation of each source to reduce the corresponding error signal to zero.

No references cited.

UNITED STATES PATENT OFFICE
CERTIFICATE OF CORRECTION

Patent No. 3,076,898                      February 5, 1963

Nathan Cohn

It is hereby certified that error appears in the above numbered patent requiring correction and that the said Letters Patent should read as corrected below.

Column 3, line 35, for "present" read -- preset --; column 5, line 1, for "station" read -- stations --; column 7, line 2, for "would" read -- should --; line 67, for "bases" read -- basis --; column 9, line 4, for "11" read -- 111 --; column 11, lines 18 and 19, for "numbed" read -- number --; column 15, lines 26 to 28, for that portion of Equation 1 reading "$G_S-b_u-$" read -- $G_S=b_u-$ --.

Signed and sealed this 25th day of February 1964.

(SEAL)
Attest:

ERNEST W. SWIDER                      EDWIN L. REYNOLDS

Attesting Officer                      Acting Commissioner of Patents